United States Patent
LaDow

(12) 
(10) Patent No.: US 6,443,111 B1
(45) Date of Patent: Sep. 3, 2002

(54) POLY VALVE SYSTEM FOR INTERNAL COMBUSTION ENGINES

(76) Inventor: Ron LaDow, 283 Conneticut St., San Francisco, CA (US) 94107

(*) Notice: Subject to any disclaimer, the term of this patent is extended or adjusted under 35 U.S.C. 154(b) by 42 days.

(21) Appl. No.: 09/791,291

(22) Filed: Feb. 23, 2001

Related U.S. Application Data

(63) Continuation of application No. 09/312,032, filed on May 14, 1999, now abandoned.

(51) Int. Cl.$^7$ .................................................. F01L 9/04
(52) U.S. Cl. ........................... 123/90.11; 123/90.65; 123/308; 123/432
(58) Field of Search ..................... 123/90.11, 90.12, 123/90.14, 90.27, 90.65, 308, 432

(56) References Cited

U.S. PATENT DOCUMENTS

| | | | |
|---|---|---|---|
| 2,005,089 A | 6/1935 | Krebs | 123/90.65 |
| 2,072,437 A | 3/1937 | Wuetele | 123/90.12 |
| 2,126,885 A | 8/1938 | Heintz | 123/90.12 |
| 4,256,068 A | 3/1981 | Irmajiri et al. | 123/432 |
| 4,515,343 A | 5/1985 | Pischinger et al. | 123/90.11 |
| 4,587,936 A | 5/1986 | Matsuura et al. | 123/90.12 |
| 4,593,657 A | 6/1986 | Aoi | 123/90.6 |
| 4,617,881 A | 10/1986 | Aoi | 123/90.27 |
| 4,658,780 A | 4/1987 | Hodoi | |
| 4,660,529 A | 4/1987 | Yoshikawa | 123/432 |
| 4,766,866 A | 8/1988 | Takii et al. | 123/432 |
| 4,870,930 A | 10/1989 | Yagi | 123/90.11 |
| 5,007,387 A | 4/1991 | Arao | 123/90.22 |
| 5,022,357 A | 6/1991 | Kawamura | 123/90.11 |
| 5,094,197 A | 3/1992 | Rosa | 123/90.27 |
| 5,095,858 A | 3/1992 | Ascari | 123/90.27 |
| 5,111,791 A | 5/1992 | Onodera | |
| 5,140,955 A * | 8/1992 | Sono et al. | 123/90.15 |
| 5,163,390 A | 11/1992 | Shimamoto | 123/432 |
| 5,184,580 A | 2/1993 | Ascari | 123/90.27 |
| 5,375,568 A | 12/1994 | Manolis | |
| 5,586,529 A * | 12/1996 | Vallve | 123/90.65 |
| 5,669,341 A | 9/1997 | Ushirono | 123/90.12 |
| 5,868,113 A | 2/1999 | Yoshikawa | 123/308 |
| 6,070,853 A * | 6/2000 | Stolk et al. | 251/129.18 |
| 6,076,490 A * | 6/2000 | Esch et al. | 123/90.11 |
| 6,148,778 A | 11/2000 | Sturman | 123/90.12 |
| 6,176,208 B1 * | 1/2001 | Tsuzuki et al. | 123/90.11 |

* cited by examiner

Primary Examiner—Weilun Lo
(74) Attorney, Agent, or Firm—Goldstein & Lavas, P.C.

(57) ABSTRACT

A poly valve system for an internal combustion engine having at least one cylinder having a bore, a piston capable of reciprocal travel within the bore, a cylinder head adjacent the bore, and a combustion chamber defined between the cylinder head and the piston, comprising a plurality of independently operated valves. Intake and exhaust manifolds are located adjacent to the cylinder head. Valve seats comprise openings in the cylinder head between one of the manifolds and the combustion chamber. Poppet valves are situated in the valve seats to selectively allow communication between one of the manifolds and the combustion chamber. The valves are electrically, pneumatically, or hydraulically operated so that each valve, including one of several intake valves per cylinder, may be operated independently of each other.

7 Claims, 2 Drawing Sheets

POLY VALVE SYSTEM FOR INTERNAL COMBUSTION ENGINES

CROSS REFERENCES AND RELATED SUBJECT MATTER

This application is a continuation of patent application Ser. No. 09/312,032, filed in the United States Patent office on May 14, 1999, now abandoned.

BACKGROUND OF THE INVENTION

The invention relates to a poly valve system for internal combustion engines. More particularly, the invention relates to a valve system which employs several independently operated intake valves and several independently operated exhaust valves per cylinder.

In an internal combustion engine, intake and exhaust valves serve a crucial function. They must each open at an appropriate time to allow combustible gases in or exhaust out, and remain tightly closed at all other times to maximize the power derived from combustion.

The performance of the engine is also closely linked to the valves. It is well known that the more an engine "breathes" the more power it will generate. It seems obvious that the more fuel and air that enters the combustion chamber, the greater the force of the explosion and the greater the power generated thereby. However, the ability of the engine to eliminate combustion by-products is also an important factor in performance. In fact the engine "redline"—the practical rev limit for an engine—is in large part determined by the speed at which the exhaust valves can no longer expel sufficient burned gases to allow efficient combustion to occur.

Traditionally, valve systems are fully mechanical systems. At least one cam shaft is used to precisely determine the times during the engine cycle when each valve is to be opened and closed. For each valve, a cam follower traces the movements of the cam shaft, and causes the valve "poppet" to open and close. One problem with this arrangement is the lack of flexibility. Once the cams are set, it is not possible to change the relative opening and closing times of the valves. In addition, the entire cam system itself comprises numerous moving parts which require maintenance and which to some extent detract power from the engine.

Over the last two decades, adding an extra intake and an extra exhaust valve per cylinder has become prevalent in automobile engines of all types. This change has thus lead to increased engine performance by simply increasing the inward and outward flow of the combustion chamber. In such engines, it has been the general practice to have both intake valves to open and close at the same time.

Experimentation with increasing the number of valves has revealed practical limitations. Having a large number of valves quickly increases the complexity of the cylinder head configuration, and causes porting problems. Some have sought to maximize the number of valves by conceiving variations of traditional cam operated valve technology.

U.S. Pat. No. 5,375,568 to Manolis et al. discloses a multi-valve internal combustion engine which has a cluster valve system, wherein four intake valves are mechanically ganged and all operate off a common cam follower. Four exhaust valves are also provided in a similar arrangement.

U.S. Pat. No. 5,111,791 to Onodera discloses a cylinder head and valve train arrangement for a multiple valve engine. Onodera discloses a six valve arrangement, wherein special attention has been given to solving the problem of positioning and synchronizing cam shafts to operate these valves. Care is taken to carefully synchronize the opening of all four intake valves even though two separate cam shafts are used for opening these valves.

U.S. Pat. Nos. 4,658,780 to Hosoi; U.S. Pat. No. 5,007,387 to Arao; U.S. Pat. No. 5,094,197 to Rosa; and U.S. Pat. No. 5,184,580 to Ascari all disclose multiple intake and exhaust valve systems. These patent references are all concerned with working out the mechanics of a multi-valve system using existing cam operated valves. They are generally concerned with synchronizing the valves where the use of multiple valves conflicts with the ordinary design constraints of standard single cam valve operation.

U.S. Pat. No. 4,587,936 to Matsuura et al. discloses a valve control system which employs traditional cam-based valve opening. Matsuura has provisions to mechanically deactivate one of the intake valves under certain engine conditions. However Matsuura is not able to provide any other flexibility or control over valve opening or timing, other than being able to simply disable one of the valves.

U.S. Pat. No. 5,669,341 to Ushirono et al. discloses a valve operating system which uses an electrically operated valve in addition to a mechanically operated valve. However, Ushirono et al. only employs the electrically operated valve during certain engine conditions.

While these units may be suitable for the particular purpose employed, or for general use, they would not be as suitable for the purposes of the present invention as disclosed hereafter. In particular, these multiple valve systems all seek to employ a modified mechanical cam-based opening system. They are generally concerned with ensuring that all intake valves open together. However, some study has revealed that carefully creating turbulence in the combustion chamber can increase engine performance. But, the prior art systems are unsuitable for experimentation to optimize such effects, because they do not allow independent operation or opening timing between the various intake valves. In addition, internal stresses generated by the cam system inertia in itself limits rev speeds that the engine can achieve.

SUMMARY OF THE INVENTION

It is an object of the invention to increase the performance of an internal combustion engine. Accordingly, the invention is a poly valve system which employs several intake and several exhaust valves per cylinder.

It is another object of the invention to provide multiple valves per cylinder without requiring a complex cylinder head configuration. Accordingly, the poly valve system eliminates the cam structure ordinarily required in four stroke engines.

It is yet another object of the invention to create turbulence within the cylinder during the intake cycle. Accordingly, fully independent valve operation and freedom of valve placement allow the effects of intake turbulence to be optimized.

It is a further object of the invention to greatly increase the revolution limit of the engine. Accordingly, the use of multiple valves, and the lack of reliance on a mechanical system to open and close the valves greatly increases the allowable rotary speed for the engine. In addition, the lower mass and complexity of the poly valve system allows greater speeds to be achieved.

It is a still further object of the invention that practically random valve operation is achievable. Accordingly, electric, hydraulic, or pneumatic valves may be employed so that fully random selection of opening and closing times can be determined and executed in accordance with achieving maximum efficiency.

It is yet a further object of the invention to reduce the overall size of the engine. Accordingly, by eliminating standard camming mechanisms, a significant space savings can be achieved.

It is a still further object of the invention to optimize the shape of the combustion chamber. Accordingly, by having the ability to place numerous, smaller valves at flexible locations in the cylinder head, the piston need not be altered to provide valve clearance and thus can have a smoother shape.

The invention is a poly valve system for an internal combustion engine having at least one cylinder having a bore, a piston capable of reciprocal travel within the bore, a cylinder head adjacent the bore, and a combustion chamber defined between the cylinder head and the piston, comprising a plurality of independently operated valves. Intake and exhaust manifolds are located adjacent to the cylinder head. Valve seats comprise openings in the cylinder head between one of the manifolds and the combustion chamber. Poppet valves are situated in the valve seats to selectively allow communication between one of the manifolds and the combustion chamber. The valves are electrically, pneumatically, or hydraulically operated so that each valve, including one of several intake valves per cylinder, may be operated independently of each other.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
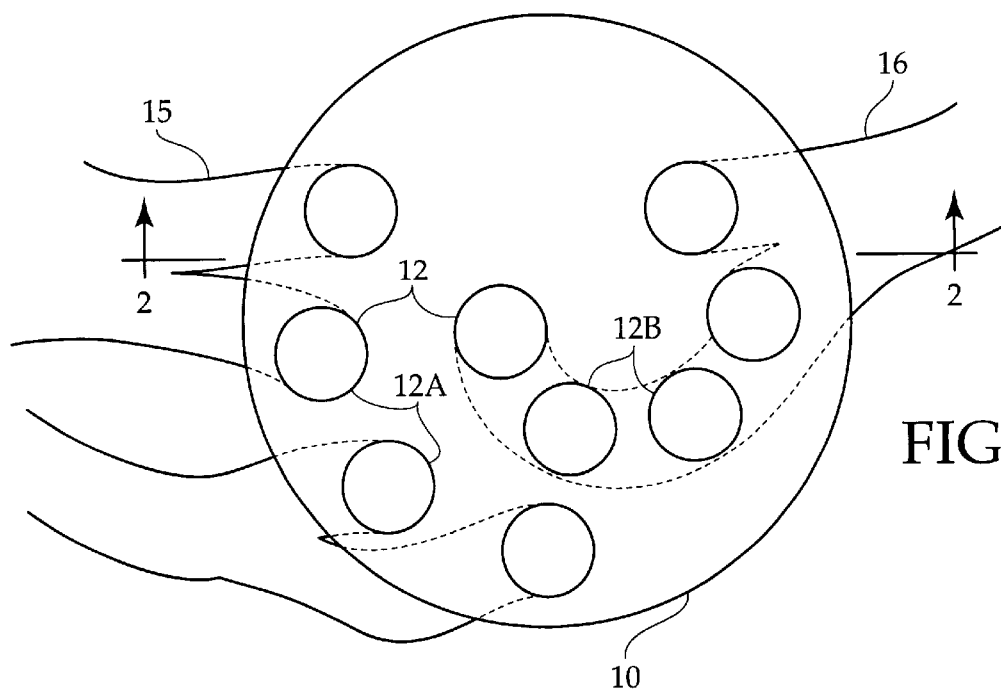
FIG. 1 is a diagrammatic top plan view, illustrating a portion of a cylinder head associated with one cylinder, indicating an exemplative valve placement which may be used in accordance with the present invention.

FIG. 1 diagrammatically illustrates a cylinder head 10 having a plurality of valve openings 12 depicted therein. The valves comprise intake valves 12A and exhaust valves 12B. An intake manifold 15 is in communication with the intake valves 12A, and an exhaust manifold 16 is in communication with the exhaust valves 12B.

Figure 2:
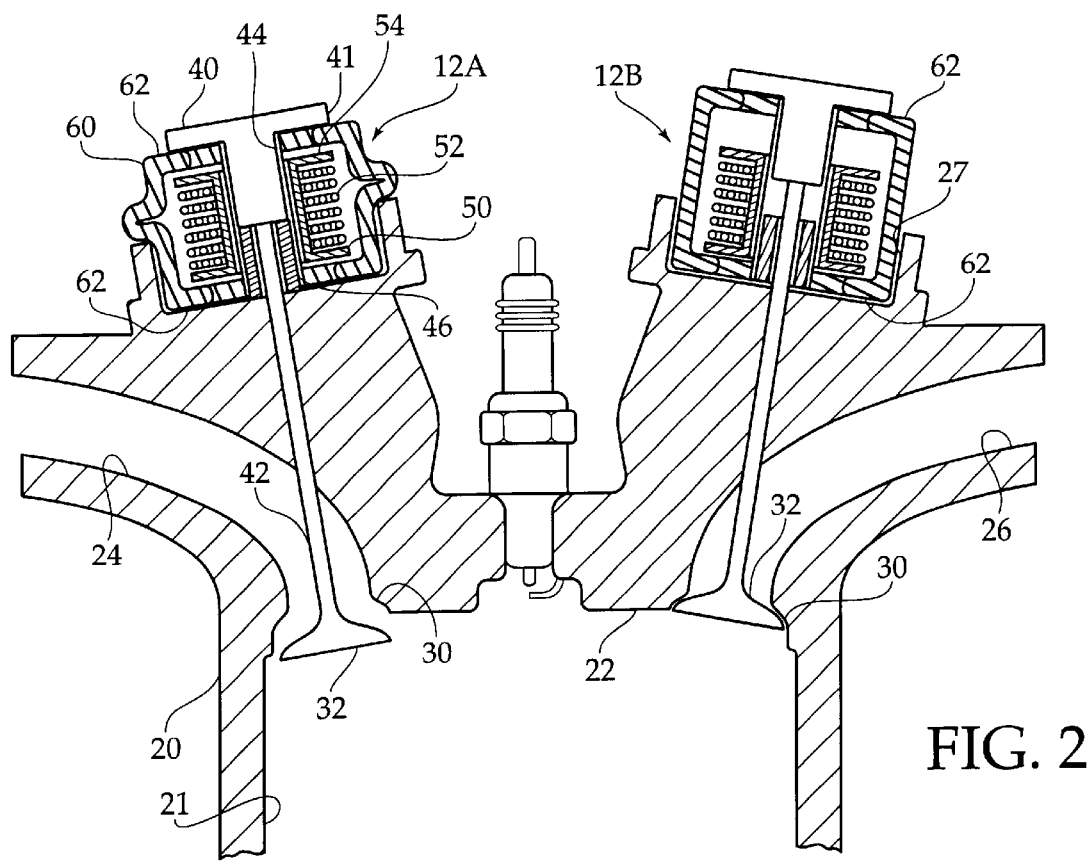
FIG. 2 is a cross sectional view of a cylinder, showing a pair of independently operable valves, wherein the valves are constructed according to an electrically operated embodiment of the invention.

FIG. 2 is a cross sectional view, which illustrates a cylinder 20. The cylinder 20 has a bore 21, through which a piston (not shown) reciprocates. A cylinder head 22 is located on top of the bore 21 toward and away from which the piston reciprocates. Together the bore 21, the cylinder head 22 and the piston define a combustion chamber. The cylinder head 22 includes an intake passageway 24 and an exhaust passageway 26, which form part of the intake and exhaust manifolds shown in FIG. 1. Both the intake passageway 24 and exhaust passage way 26 are in communication with the combustion chamber though a valve seat 30. A poppet 32 is located at each valve seat 30 for selectively opening its respective passageway to the combustion chamber, or closing the same.

Illustrated in FIG. 2 are one of the intake valves 12A and one of the exhaust valves 12B, which are capable of operating their respective poppets 32 to selectively open and close the intake passageway 24 and exhaust passageway 26 to the combustion chamber. In FIG. 2, the poppet 32 for the intake valve 12A is open, and the poppet 32 for the exhaust valve 12B is closed.

With respect to the particular structure of the valves 12, the most apparent feature is the absence of any cam structure. Each of the valves 12 is independently operable by electrical, hydraulic, or pneumatic means. In the embodiment illustrated in FIG. 2, the valves 12 are electrically operated.

FIG. 2 illustrates one example of an electrically operated valve suitable for the poly valve system of the present invention. The valve 12 includes a T-cap 40 attached to the poppet 32 by a poppet shaft 42. The T-cap 40 has a flange 41 which is fully opposite the poppet 32 and a barrel 44 extending from the T-cap 40 toward the poppet 32 and coaxial with the poppet shaft 42. At least a portion of the flange 41 is made of a ferrous metal. The valve includes a solenoid 50 located between the poppet 32 and the T-cap 40. A limit sleeve 46 is mounted between the cylinder head 22 and the T-cap 40, the poppet shaft 42 extending through the limit sleeve 46, for limiting the downward travel of the poppet. The limit sleeve 46 stops downward travel of the poppet 32 when the barrel 44 of the T-cap 40 reaches the limit sleeve 46.

The solenoid 50 comprises a solenoid coil 52 mounted on a spindle 54 coaxial with the poppet shaft 42. When the solenoid coil 52 is energized, the flange 41 of the T-cap 40 is attracted toward the spindle 54, moving the poppet shaft 42 and thus the poppet downward, opening the valve.

A spring means is provided between the cylinder head and T-cap 40 for biasing the T-cap away from the cylinder head, and thus for biasing the poppet in the closed position. The spring means acts to return the poppet to its valve seat and close the valve immediately after power is removed from the solenoid coil.

In FIG. 2, the spring means is an elastomeric housing 60 which also acts as an enclosure for the solenoid 50. The elastomeric housing 60 is cylindrical, is coaxial with the poppet shaft 42, and has two housing ends 62. One of the housing ends 62 extends against the flange 41 of the T-cap 40, and the outer housing end 62 extends against the cylinder head. The cylinder head has a valve recess 27 within which said housing end 62 is mounted and is stabilized thereby.

In FIG. 2, the intake valve 12A is shown in the open position, while the exhaust valve 12B is shown in the closed position. As illustrated, the elastomeric housing 60 has buckled as the intake valve 12A opened. When the solenoid coil is de-energized, the elastomeric housing 60 "pops back", closing the valve, as shown by the exhaust valve 12B.

Figure 3:
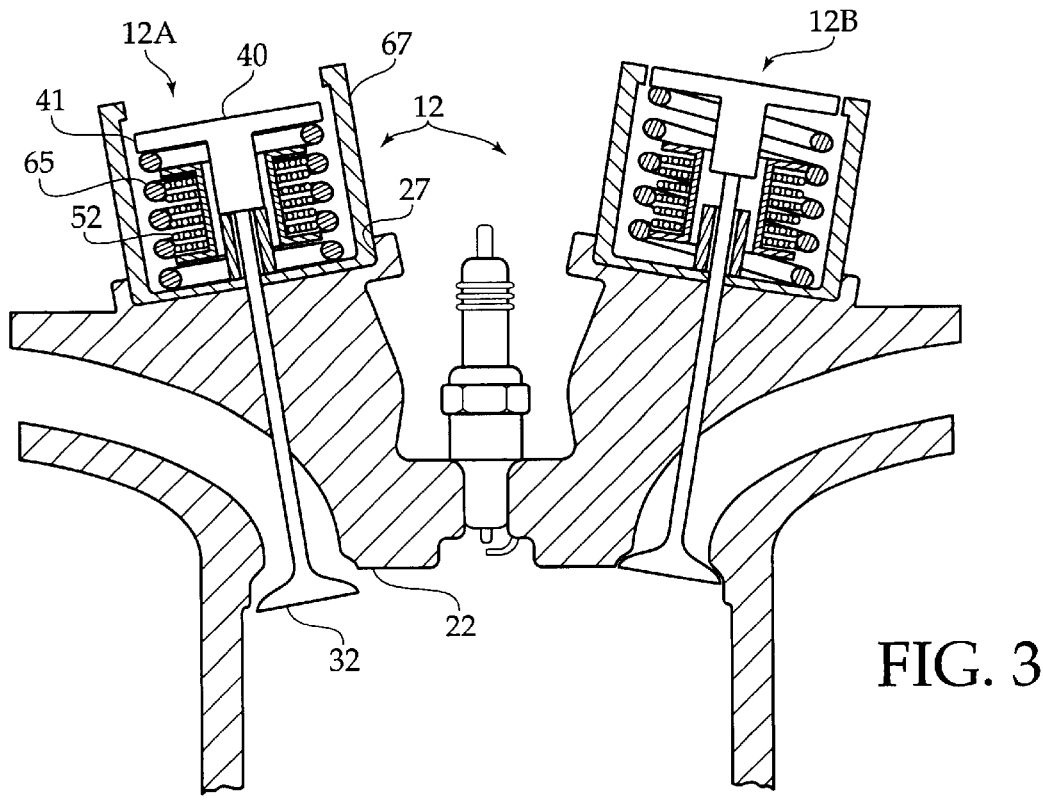
FIG. 3 is a cross sectional view of a cylinder, wherein similar to FIG. 2, except wherein the valves are of an electrically operated embodiment of the invention which uses a coil spring to restore the valve to the closed position.

FIG. 3 illustrates another embodiment of the valve 12, wherein the spring means is a coil spring 65 mounted between the T-cap 40 and the cylinder head 22. The coil spring 65 and the solenoid are preferably contained within a rigid housing 67 which is mounted in the valve recess 27. Once again, in FIG. 3, the intake valve 12A is shown in the open position while the exhaust valve 12B is shown in the closed position. As in the embodiment of FIG. 2, the valve 12 operates by attracting the T-cap flange 41 toward the solenoid coil 52 to open the valve, and then the valve is closed by de-energizing the solenoid coil 52 and allowing the coil spring 65 to return poppet 32 to the closed position.

Figure 4:
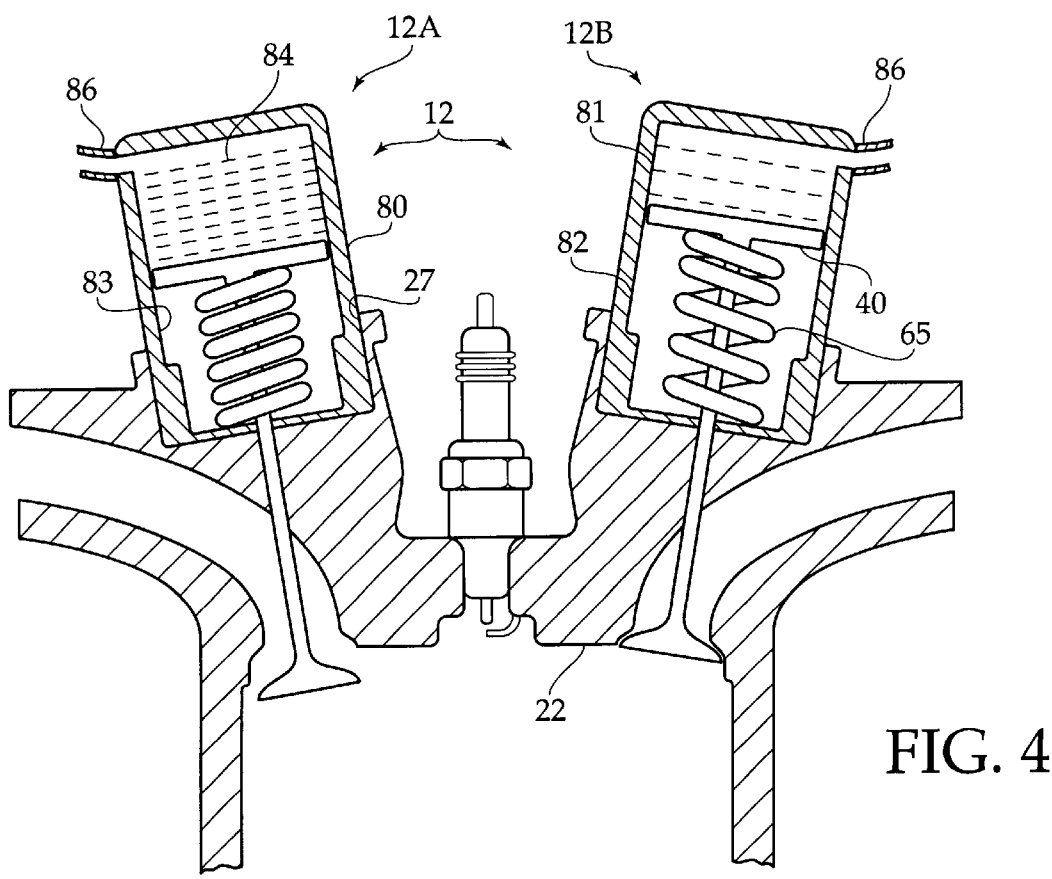
FIG. 4 is a cross sectional view of a cylinder, wherein the valves are hydraulically or pneumatically operated.

FIG. 4 illustrates a further embodiment of the invention, in which the valves 12 are hydraulically or pneumatically operated using a fluid medium. "Fluid" as used herein, can refer to either a liquid or gas medium suitable for use in transfering mechanical energy. The valves 12 comprise a sealed housing 80 which is mounted within the valve recess 27 of the cylinder head. The sealed housing 80 has smooth inner walls 83, an upper portion 81 and a lower portion 82. The T-cap 40 is sized to fit tightly within the sealed housing 80 so that it can move upward and downward within the sealed housing 80, toward and away from the cylinder head 22, while maintaining a close fit with the inner walls 83. The coil spring is mounted between the T-cap 40 and the lower portion 82 of the sealed housing 80 The upper portion is in fluid communication with a control line 86. Fluid 84 is present in the upper portion 81 above the T-cap 40. When the fluid 84 in the upper portion 81 is pressurized by means of the control line 86, the T-cap 40 is pushed downward and thus the valve is opened, as shown by the intake valve 12A. When pressure in the upper portion 81 is released by releasing pressure in the control line 86, the coil spring 65 returns the poppet to its valve seat, closing the valve, as illustrated in FIG. 4 by the exhaust valve 12B.

Regardless of the particular valve configuration used, all valves are operated under the control of a central control unit. Since the valves are each individually operable operation of the engine, valve timing and opening duration may be completely determined by said control unit. In the case of the electrically operated valves, a buffered or amplified signal from a microcontroller is all that is necessary to actuate the valves. When pneumatic or hydraulic valves are used, an intermediary system is necessary to pressurize and evacuate the control lines at appropriate times under the direction of the control unit. Nevertheless, whether pneumatic or hydraulic lines are used for the control line, or an electrical connection is made to the solenoid, such control connections communicate what may be referred to as a control signal. The term control signal is appropriate because it is the mere presence of the signal that causes the valve to operate, and not the position of any other engine components. In other words, the valve can even be made to operate at a completely inappropriate time, such as during the compression or combustion strokes, if so desired.

Because the valves are not mechanically linked to the rotation of the crankshaft, they are fully independently operable, the various intake valves for each cylinder may be operated independently. Thus, the staggered opening of the various intake valves may be used to create a turbulent "swirl" during the intake stroke. Empirical study can determine the most effective opening order, opening times, and opening duration for the valves, and can determine variations for different engine speeds. The control unit can then be programmed with this data, and operate the valves accordingly. With the flexible valves arrangement of the present invention, similar study could conceivably be used to determine if varying the exhaust valve opening order has an bearing on the ability of the engine to evacuate the combustion chamber of exhaust gases during the exhaust stroke. In addition, valve placement on the cylinder head has greater flexibility when compared to cam operated valve systems. Thus, the valve placement can be optimized through empirical experimentation to maximize the swirl effect, air flow, and thus engine performance.

In conclusion, herein is presented a poly valve system which improves engine performance by providing multiple, independently operable valves per cylinder. The engine configuration disclosed herein provides a platform for experimentation to determine valve order, opening timing, and opening duration to maximize engine performance.

What is claimed is:

1. A valve system for an internal combustion engine comprising at least one cylinder defining a bore for receiving a piston, a cylinder head adjacent to said bore, a combustion chamber defined within the bore between the piston and cylinder head, an intake manifold and an exhaust manifold adjacent to the cylinder head, valve seats in the cylinder head which each provide communication between the combustion chamber and one of the exhaust manifold and intake manifold, comprising;

at least three intake valves associated with the cylinder for selectively controlling communication between the intake manifold and the combustion chamber, the valves each have a poppet located in one of the valve seats for selectively opening and closing communication between the intake manifold and combustion chamber through said valve seat, a poppet shaft attached to the poppet and each valve further comprises a solenoid for selectively pushing the poppet out of its valve seat and toward the combustion chamber to open said valve, each valve further comprises a T-cap attached onto the poppet shaft fully opposite the poppet, the T-cap is made of a ferrous metal, and the solenoid comprises a solenoid coil mounted between the poppet and the T-cap, the solenoid coil coaxial with the poppet shaft, wherein the T-cap is attracted to the solenoid coil when the solenoid coil is energized to displace the poppet from the valve seat to open the valve, each T-cap comprises a flange and a barrel portion, the barrel portion coaxial with the poppet shaft, the valve further having a limit sleeve mounted between the cylinder head and the T-cap, the poppet shaft extending through the limit sleeve for limiting the downward travel of the poppet when the barrel reaches the limit sleeve; and each valve is independently operated by a control signal.

2. The valve system as recited in claim 1, wherein the intake valves are each opened at distinct times as directed by a control unit.

3. The valve system as recited in claim 2, further comprising a plurality of exhaust valves associated with each cylinder which each control communication between the exhaust manifold and the combustion chamber, wherein each of the exhaust valves is independently operable.

4. The valve system as recited in claim 3, wherein at least three exhaust valves are present at each cylinder.

5. The valve system as recited in claim 1, wherein the cylinder head has a valve recess within which the valve is mounted.

6. The valve system as recited in claim 5, wherein each valve has a coil spring mounted between the cylinder head and the T-cap for biasing its poppet against its valve seat.

7. The valve system as recited in claim 5, wherein each valve further has an elastomeric housing mounted within the valve recess, encasing the solenoid, the flange of the T-cap located outside of the elastomeric housing, so that when the solenoid is energized the T-cap causes the elastomeric housing to temporarily buckle, and when the solenoid is de-energized the elastomeric housing pops back to restore its poppet against its valve seat.

* * * * *